United States Patent [19]
Fielding

[11] 3,785,899
[45] Jan. 15, 1974

[54] METHOD FOR THE MANUFACTURE OF CELLULAR MATERIAL FOR CUSHIONING AND OTHER PURPOSES

[75] Inventor: Alfred W. Fielding, Wayne, N.J.

[73] Assignee: Sealed Air Corporation, Fair Lawn, N.J.

[22] Filed: June 8, 1971

[21] Appl. No.: 150,954

[52] U.S. Cl.................. 156/209, 156/320, 156/553
[51] Int. Cl............................................ B32b 31/16
[58] Field of Search..................... 156/209, 320, 553

[56] References Cited
UNITED STATES PATENTS
3,508,992   4/1970   Chavannes........................... 156/209
2,538,520   1/1951   Holt et al......................... 156/320 X Primary Examiner—Ralph S. Kendall
Attorney—Eugene E. Geoffrey, Jr.

[57] ABSTRACT

Method and apparatus for the manufacture of a cellular material which utilizes an embossing roller to emboss at least one film after being preheated to an embossing temperature. At least the embossed sheet preferably includes a coating of adhesive which is reactivated during the preheating procedure so that upon applying a second unheated film to the embossed film the individual embossments will be sealed. The preheating means is arranged so that it can be moved out of its normal operating position in order to enable termination of the embossing and sealing process, and means are utilized to rapidly interchange the embossing rollers to minimize the down time for the apparatus.

8 Claims, 11 Drawing Figures

INVENTOR
ALFRED W. FIELDING
BY
ATTORNEY

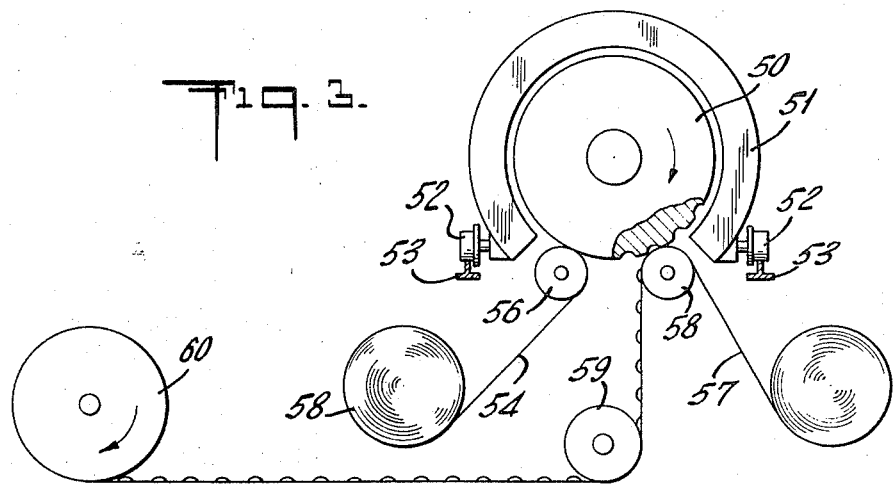
Fig. 3.
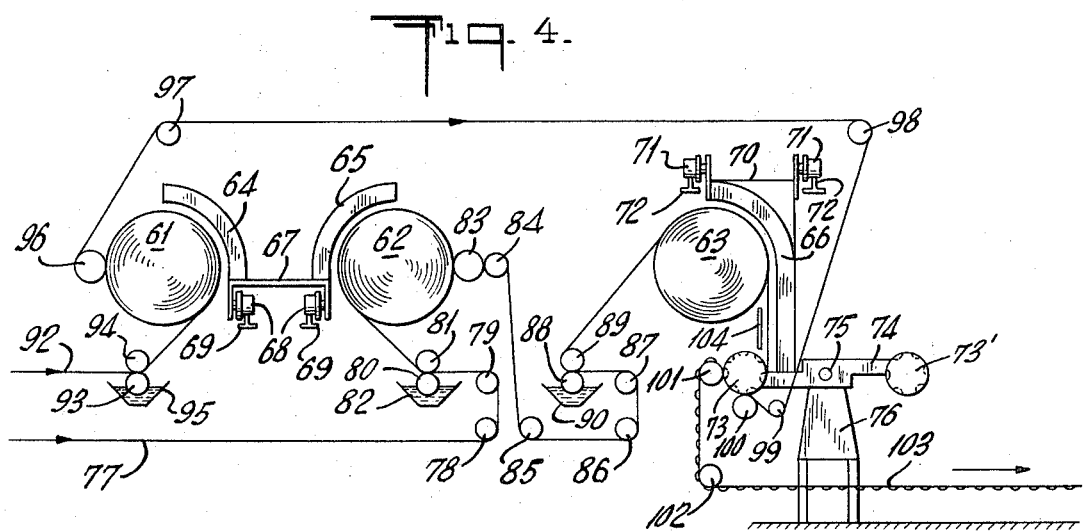
Fig. 4.
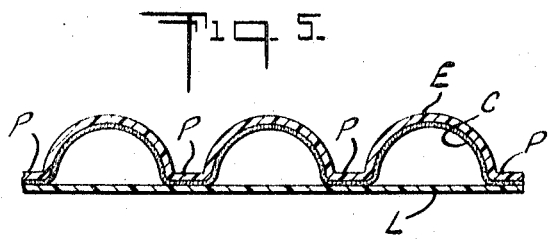
Fig. 5.
INVENTOR
ALFRED W. FIELDING
BY
ATTORNEY

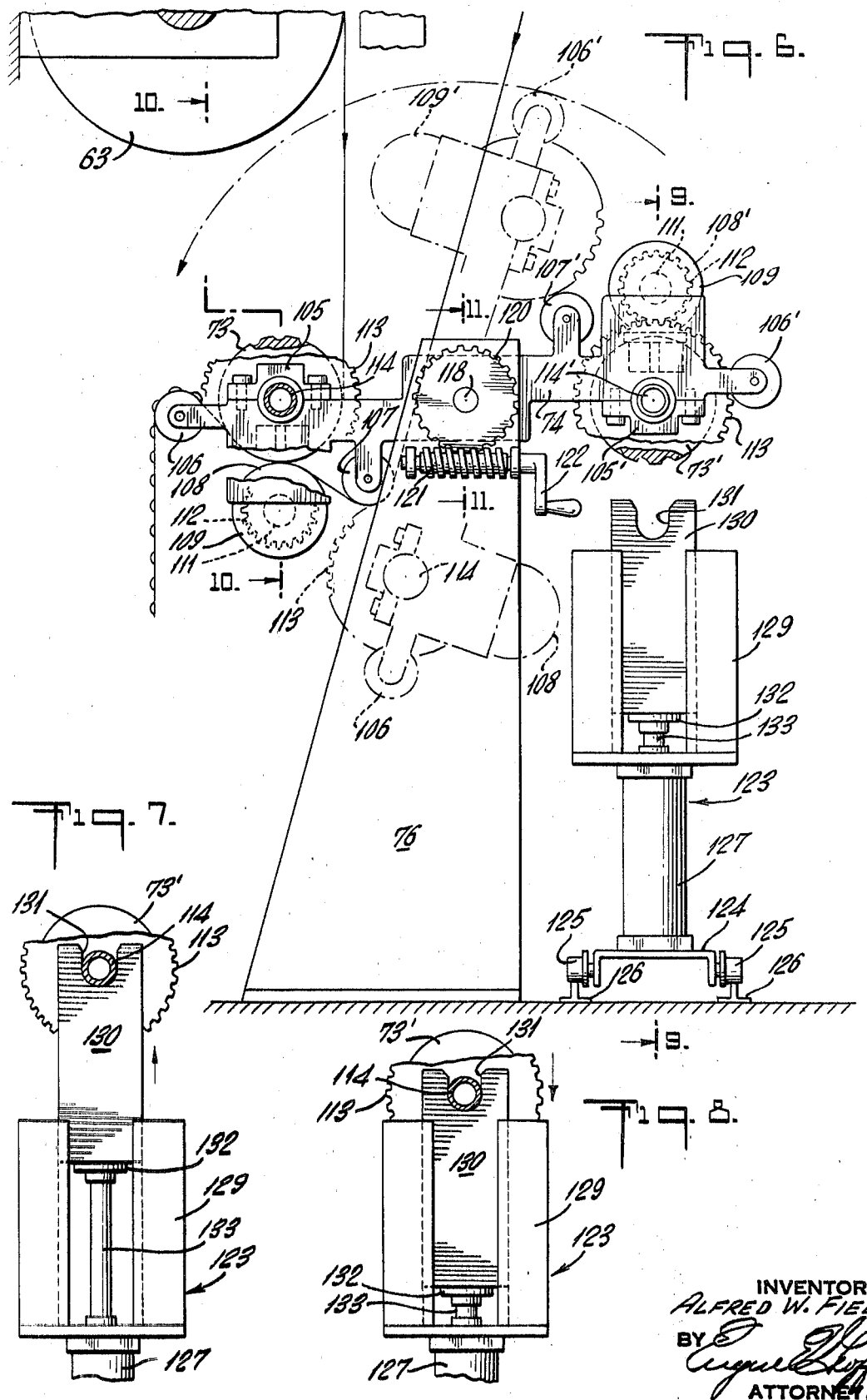

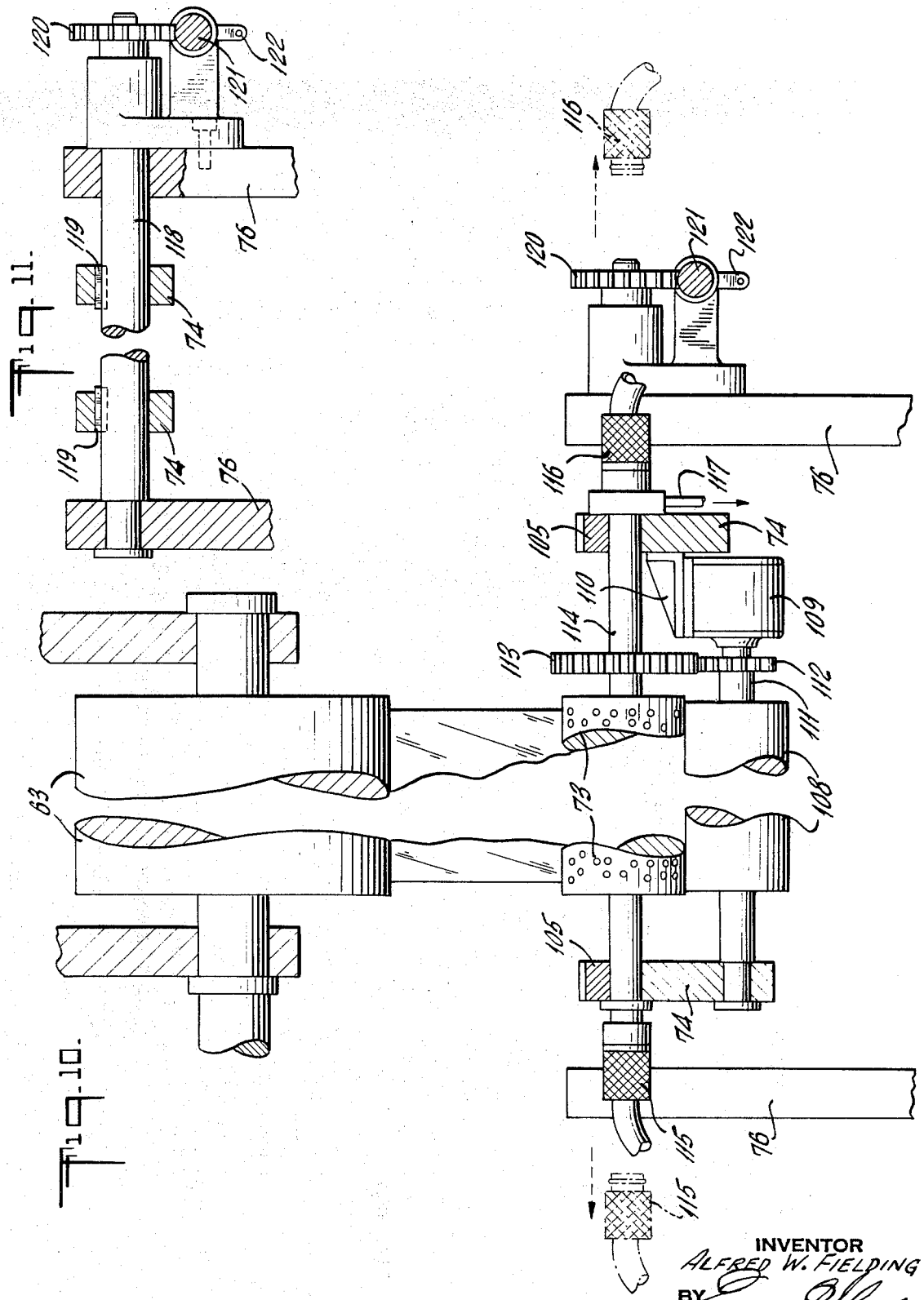

METHOD FOR THE MANUFACTURE OF CELLULAR MATERIAL FOR CUSHIONING AND OTHER PURPOSES

This invention relates to the manufacture of cellular material for cushioning, insulating and other purposes and more specifically to a novel and improved method and apparatus for the manufacture of cushioning and insulating structures which may be formed of a wide variety of sheet materials such as thermoplastics, thermoformable plastics, foils, papers and combinations thereof which will enable the formation of sealed cells for the retention of air or other gases therein.

Cushioning and insulating materials formed of thin plastic sheets wherein at least one of the sheets was embossed to form a plurality of cells, and a second sheet was sealed to the unembossed side of the first sheet have been produced utilizing various types of heat sealing procedures and adhesives. Cellular materials have also been fabricated from laminated sheets wherein a base sheet was coated with a gas impervious layer such as polyvinylidene chloride or the like in order to prevent the loss of air in cells when subjected to pressure for any length of time.

This invention concerns improved methods and apparatus for forming cellular materials which greatly simplifies the fabricating process and facilitates the utilization of sheets formed of a wide range of materials including materials which would be adversely affected by high temperatures normally utilized in heat sealing processes. By reason of the improved methods and apparatus in accordance with the invention, the completed cellular materials can be formed in separate steps or in a single continuous process depending upon the economic factors involved. For instance, if the completed cellular materials are to be utilized in the vicinity of the place of manufacture, the sheets to be utilized in the fabrication of the material would be processed in successive steps to produce the finished cellular product. On the other hand, if the material is to be utilized at a substantial distance from the point of manufacture, the sheets can be prepared for the embossing and sealing processes and then shipped in roll form. Upon arrival at the destination or point of use, relatively simplified equipment may be utilized to emboss at least one of the preprocessed sheets and then apply the backing or sealing sheet to complete the cellular product.

Another object of the invention resides in the provision of a novel and improved method for the manufacture of cellular materials which enables a substantial simplification of the apparatus and not only reduces the cost of the apparatus but also simplifies operating procedures with a resultant reduction in cost of the completed product.

Still another object of the invention resides in the provision of a noval and improved method for manufacturing cellular material.

A still further object of the invention resides in the provision of novel and improved apparatus for manufacturing cellular material and including improved means for interchanging embossing cylinders with minimum interruption of the embossing process.

The above and other objects of the invention will become more apparent from the following description and accompanying drawings forming part of this application.

In the drawings:

FIG. 3 is a side elevational view in partial section of apparatus for embossing and laminating preprocessed sheets of material to form a cellular product in accordance with the invention;

FIG. 4 is a diagrammatic side elevational view of apparatus for continuously coating, embossing and laminating two sheets to form a cellular material in accordance with the invention;

FIG. 5 is a cross-sectional view of one embodiment of a product formed by apparatus illustrated in FIGS. 1 through 4;

FIG. 6 is an enlarged side elevational view in partial section of the embossing roller changing means illustrated diagrammatically in FIG. 4;

FIGS. 7 and 8 illustrate the operation of the hydraulic lift shown in FIG. 6 for removal and installation of an embossing roller;

FIG. 10 is a cross-sectional view of FIG. 6 taken along the line 10—10 thereof; and FIG. 11 is a cross-sectional view of FIG. 6 taken along the line 11—11 thereof.

Figure 1:
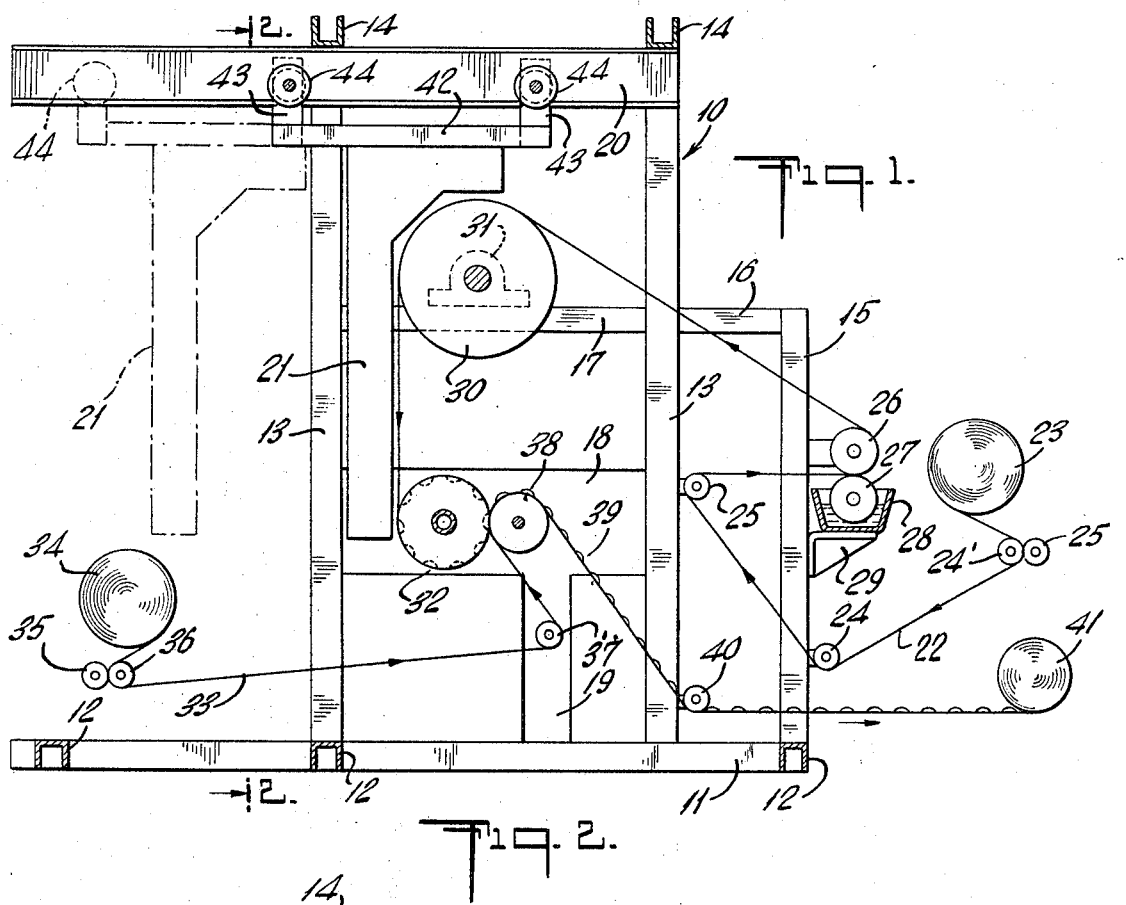
FIG. 1 is a side elevational view in partial section of one embodiment of apparatus for manufacturing cellular material in accordance with the invention.
Figure 2:
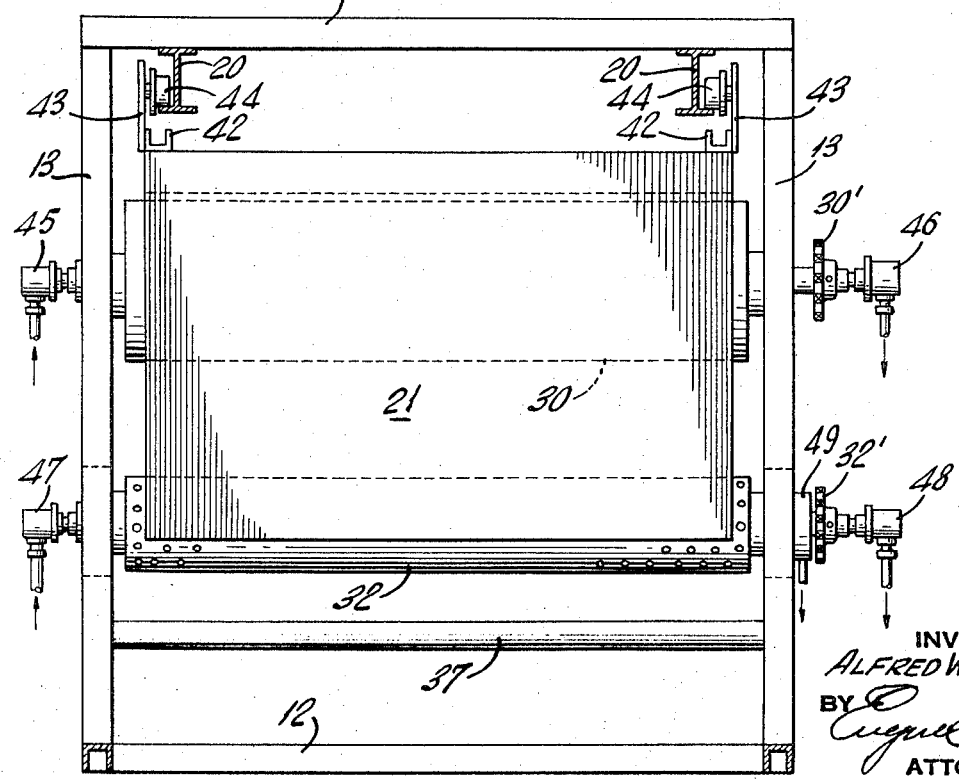
FIG. 2 is a cross-sectional view taken along the line 2—2 of FIG. 1.

One embodiment of apparatus in accordance with the invention is illustrated in FIGS. 1 and 2 and is particularly useful for fabricating cellular material utilizing an adhesive for bonding a sealing sheet to an embossed layer. The adhesive may be applied to one or both of the sheets immediately prior to the embossing and laminating operations or one or both of the sheets may be precoated. In the latter case, plastic sheet materials can be coated at a central location and then shipped to the point of use and then processed to produce the embossed and laminated material.

The embodiment of the apparatus illustrated in FIGS. 1 and 2 comprises a frame generally denoted by the numeral 10 and includes a base formed by a pair of side members 11 and transverse or end members 12 which are welded together to form a rigid structure. Four upright members 13 are welded or otherwise secured to the side members 11 of the base and bridged by upper transverse members 14. Additional framing members include a pair of upright supports 15 and horizontal supports 16 and 17. The supports 16 are welded or otherwise secured to the upright supports 15 and are welded to the adjoining upright members 13. The supports 17 are disposed in substantially parallel relationship with the base members 11 and are welded to the adjoining upright supports 13 at points spaced from the upper ends thereof. Additional side supports 18 and 19 are welded into position between the pairs of upright members 13 for supporting rollers therebetween as will be described. The upper frame members 14 carry a pair of longitudinally disposed I-beams 20 which serve as tracks for movably supporting heating means generally denoted by the numeral 21.

The film 22 to be embossed is fed from a roller 23 through the nip of rollers 24 and 25, the speed of which is controlled to provide proper tension on the film as it proceeds through the apparatus. The film is then fed about rollers 24 and 25 rotatably carried by the upright members 15 and 13, respectively, and thence between coating rollers 26 and 27. The rollers 26 and 27 are rotatably carried between the forward frame members 15 and the roller 27 is at least partially immersed in a suitable adhesive contained in the trough 28 which is also supported by means of a bracket 29 to the upright members 15. The coated film then moves upwardly about a drum 30 rotatably supported by bearings 31 carried by the transverse side members 17. The film then passes downwardly about the embossing roller 32 rotatably carried by the transverse members 18.

The laminating or sealing film 33 is fed from the roll 34 and moves downwardly between the nip of rollers 35 and 36 which rollers may be driven at a controlled speed to maintain appropriate tension on the film. The film then passes about an idler roller 37 carried by the side supports 19 whereupon it passes upwardly between the nip of the embossing roller 32 and the cooperating pressure roller 38, the latter also being supported between the side members 18. If desired, the roller 38 may be provided with a relatively thin layer of resilient material in order to firmly urge the sealing film 33 against the coated and embossed film 22 in order to effect a permanent seal. The resultant embossed and laminated material denoted by the numeral 39 passes about the pressure roller 38 and idler roller 40 carried by the upright members 13 whereupon it is formed into a roll 41.

In order to effect embossing of the film 22 and sealing of the embossed film with the laminated film 33, the film 22 must be heated to a suitable embossing temperature for the type of plastic utilized and also to dry and activate the adhesive. For this purpose the L-shaped heater 21 is utilized, and as illustrated in solid lines in the drawings, the heater 21 partially surrounds the drum 30 and extends downwardly along the path of and spaced from the film 22. It is generally desirable that the lower end of the heater terminate at a point just below a point of tangency of the film 22 and the roller 32. The heater is supported by a pair of channel members 42 which together with the upright members 43 and rollers 44 engaging the I-beams 20 form a carriage to permit the heater 21 to be readily moved from its operating position shown in solid lines in FIG. 1 to its non-operating position shown in broken lines. With this arrangement, the embossing and sealing process can be readily terminated without removing the film from the apparatus since the heater can merely be moved away from the film to terminate the heating process.

Inasmuch as heat is being constantly applied to the drum 30 and the embossing roller 32, it is generally desirable to control their temperatures in order to avoid overheating of the film. Control of the temperatures of the drum 30 and the embossing roller 32 can be effected by any suitable means as for instance by the circulation of temperature controlled water or other fluid therethrough as illustrated for instance in U.S. Pat. No. 3,208,898. While the patent illustrates one procedure for applying both a temperature controlled fluid as well as vacuum for the purpose of embossing a film, it is evident that the same procedure can be applied to the drum 30 for controlling its temperature. Similarly the structure shown in the above mentioned patent may be utilized in providing both vacuum and a temperature controlling fluid to the embossing roller 32. In the drawings inlet and outlet means for a temperature controlling fluid for the drum 30 are generally denoted by the numerals 45 and 46 while on the embossing roller the fluid inlet and outlet means are denoted by the numerals 47 and 48, and the vacuum for effecting embossing is applied by way of the pipe 49.

It is evident from the foregoing description that the apparatus is useful not only for applying an adhesive coating to the film 22 immediately prior to the heating step but may also be utilized for processing film which has been previously coated with a suitable adhesive. In the latter case, the coated film 22 can be guided directly from the rollers 24 and 25 to the heating drum 30. Sprockets or gears 30' and 32' are provided for driving the drum 30 and embossing roller 32.

A modified embodiment of the invention particularly useful for on-site processing of precoated film is illustrated in FIG. 3. In this embodiment, the embossing roller generally denoted by the numeral 50 may be constructed in a manner similar to the embossing roller 32 described in connection with FIGS. 1 and 2. The heating means 51 which extends the full length of and at least partially surrounds the embossing roller 50 is carried by rollers 52 supported by tracks 53 so that the heating means can be moved axially away from the embossing roller when it is desired to interrupt the embossing and sealing process. In operation of this embodiment of the invention, a precoated film 54 is fed from the roller 55 about a roller 56 onto the embossing roller 50. The heater 51 gradually raises the temperature of the film to permit embossment and at the same time activate the adhesive. As the film 54 emerges from the heater 51, it engages the laminating and sealing film 57 which is fed about the pressure roller 58. The pressure roller urges the film 57 into firm contact with the reactivated adhesive on the embossed film 54 and the resultant laminated and embossed structure then moves about the pressure roller 58 and roller 59 whereupon it is formed into a roll 60.

A still further embodiment of the invention is shown in FIG. 4 and provides means for coating both the film to be embossed as well as the laminating film with a barrier coating, if desired, as well as applying an adhesive coating to the film to be embossed. Other coatings for other purposes such as primers to improve adhesion may also be applied. The apparatus includes three temperature controlled drums 61, 62, and 63 with associated heaters 64, 65, and 66, each surrounding at least a portion of the periphery of its associated drum. In the instant embodiment of the invention, the heaters 64 and 65 are carried by a carriage 67 having wheels 68 riding on tracks 69. The heater 66 is supported by a carriage 70 having wheels 71 riding on tracks 72. Supporting the heaters on carriages 67 and 70 facilitates movement of the heaters axially of the drums and out of cooperating relationship therewith in order to terminate the embossing and laminating process.

The embossing roller 73 which is disposed immediately below the drum 63 may be similar to the embossing roller 32 as described in connection with FIGS. 1 and 2. In the instant embodiment of the invention, the embossing roller 73 is carried by a turret consisting of transverse supports 74 pivotally mounted at 75 to a pair of vertical supports 76 so that the roll 73 can be moved into and out of the operating position. A second embossing roller 73' is mounted on the opposite ends of the transverse supports 74 so that if it is desired to modify the type and size of embossments, the desired roller 73' can be secured in position while the embossing and laminating operation is in progress with roller 73. When the roller 73' is properly secured in position, the process can be terminated and the roller 73' can be moved quickly and easily into the position occupied by roller 73, while at the same time the roller 73 is moved to the position previously occupied by the roller 73'. One form of apparatus for accomplishing these objectives will be described in detail in connection with FIGS. 6 through 11.

The film 77 to be embossed is fed from a roll about a pair of rollers 78 and 79 and thence between the nip of rollers 80 and 81. The roller 80 is at least partially immersed in a liquid bath 82 containing a suitable primer which may function as a barrier or may improve adhesion of the adhesive coating. The coated film is then passed about the drum 62 for the purpose of drying the coating as its passes beneath the heater 65. The coated film is then removed from the drum 62 by rollers 83 and 84 and then passes about rollers 85, 86, and 87, and thence through the nip of rollers 88 and 89. The roller 88 is at least partially immersed in an adhesive bath 90 and the coated film then moves about the drum 63 and then downwardly onto the embossing roller 73. The heater 66 differs from the heaters 64 and 65 in that it extends partially around the drum 63 and then downwardly to a point approximately in line with the point of tangency of the film 77 with the embossing roller 73. The heater 66 not only dries and activates the adhesive coating but also heats the film 77 to a temperature above the embossing temperature for the particular type of plastic being utilized.

The laminating or sealing film 92 is also fed from a suitable roll and thence between the nip of rollers 93 and 94. The roller 93 is at least partially immersed in a barrier coating or liquid adhesive bath 95, as desired, and then passes about the drum 61 where it is dried by the heater 64. The coated film then passes about rollers 96, 97, and 98 and 99 and is fed into overlying relationship with the embossed film 77 on the embossing roller 73. A pressure roller 100 urges the two films into firm contact one with the other to produce firm adhesion of the two films and the completed material is then removed from the apparatus by rollers 101 and 102, the completed film being denoted by the numeral 103.

One embodiment of an embossed and laminated cellular material produced by the embodiments of the invention illustrated in FIGS. 1 through 4 is shown in FIG. 5. In this figure the embossed film denoted by the letter E has a coating C on the inner surface thereof. The laminating film L is illustrated as being uncoated and is adhered to the embossed layer E at the unembossed portion P. The structure shown in FIG. 5 is merely for illustrative purposes as one or both films may be coated on either the inside or outside with barrier and/or adhesive coatings and may be pre-coated films. The two layers would of course be adhered at the portions P.

While specific means for driving the plurality of rollers in each of the embodiments of the invention previously described have not been shown in detail, it is understood that at least the heating drums and the embossing rollers would be driven along with certain of the other rollers in order to maintain proper tension on the films without stretching or distorting them during the process. In addition, in connection with FIG. 4, it may be desirable to provide a reflector 104 on the side of the film 77 opposite the heater 66 and between the drum 63 and the embossing roller 73 in order to increase the heat imparted to the film 77.

The layer to be embossed in each of the previous embodiments of the invention may be formed of any of a wide variety of plastic materials such as polyethylene, polyvinyl chloride and copolymers thereof, polyvinyl acetates, polyvinylidene chloride and copolymers, polyproplenes, and polyolefins as well as any of the thermo-setting resins having a thermoplastic stage. Inasmuch as the laminating layer does not need to be heated in order to effect a seal through the utilization of adhesives, any of the foregoing plastics may be utilized as well as foils, coated paper and the like. For the same reasons, the laminating film can be formed of heat sensitive metalized plastics or preprinted since the inks utilized in printing will not change color.

The adhesives applied by the gravure rollers 27 in FIG. 1, 80, 88, and 93 in FIG. 4, may be either of the curing or the cross-linking types or reactivating types depending on the specific application. The curing or cross-linking adhesives as well as the reactivating adhesives can be utilized when the adhesive is applied to one or both of the sheets immediately prior to the embossing and laminating process. In the event it is necessary to apply the adhesive coatings long in advance of the embossing and laminating procedure, it is necessary to utilize heat reactivated adhesives. Examples of the curing or cross-linking adhesives are the linear saturated polyester adhesives such as the adhesives manufactured by USM Corporation and sold under the names Bostik 7064 and Bostik 7660, polyurethanes and complex acrylic interpolymers. Examples of heat reactivated adhesives include thermoplastic polyurethanes, polyvinyl acetates, ethylene vinyl acetates, blends of polyvinylidene chloride, polyethylenes, polyvinyl acetate-ethylene copolymers, polyvinyl acetate-acrylate copolymers and nitrile rubber polymers. In certain instances two or more layers of adhesive may be applied when it is desired to use particular adhesives which react adversely with the base film. Under these conditions a barrier coating is utilized. Furthermore, many of the plastics, such as polyethylene and polyvinyl chloride, are porous to gases, and accordingly a layer of polyvinylidene chloride is usually applied to form a substantially gas impervious laminate and also increase the strength of the completed product. When utilizing polyvinylidene chloride coatings, it is preferable to utilize adhesives which can effect a permanent bond when heated to about 160°F to 200°F.

Reference is now made to FIGS. 6 through 11 illustrating an embodiment of a structure for effecting the rapid interchange of embossing rollers previously referred to in connection with FIG. 4. For purposes of clarity, like numerals are utilized to denote like elements in FIG. 4 and FIGS. 6 through 11.

The transverse members 74 forming a turret are supported by upright frame members 76, and the embossing rollers 73 and 73' are supported near the outer ends thereof by suitable bearings. In the case of roller 73, it will be observed that the bearing blocks 105 are secured to the top sides of the members 74 while the bearing blocks 105' securing the embossing roller 73' to the members 74 are on the bottom sides thereof. The members 74 also include a pair of idler rollers 106 and 107 associated with the embossing roller 73 and idler rollers 106' and 107' associated with embossing roller 73'. Similarly a pressure roller 108 is carried by the members 74 and is pivoted at one end in one member and is coupled at the other end to a drive motor 109 secured to the other member 74 by a bracket 110. The shaft 111 of the roller 108 carries a spur gear 112 which meshes with a spur gear 113 on the shaft 114 of the embossing roller 73. The shaft 114 of the embossing roller has an inlet 115 on one end thereof and an outlet 116 on the other end thereof for the supply of a temperature controlling fluid and quick disconnect means are provided to facilitate interchange of rollers. Vacuum is also applied to the embossing roller through the outlet 117. The roller 73' is similarly arranged and also is provided with a pressure roller 108'.

Rotation of the turret to effect interchange of the embossing rollers is effected by rotation of the shaft 118 which pivotally supports the members 74. More specifically, the members 74 are fixedly secured to the shaft 118 by means of keys 119 or other suitable means, and the shaft 118 is rotatably carried by one support 76 and extends through the other support 76 as viewed in FIG. 11. A worm gear 120 is fixed to the shaft 118 and meshes with a worm 121 which may be rotated by the handle 122 to move the entire turret assembly as illustrated in FIG. 6.

While any suitable means may be utilized for removal of the embossing roller 73 or 73', as the case may be, when it is moved out of the operating position, a hydraulic lift as illustrated in FIGS. 6 through 9 has been found particularly effective. The lift generally denoted by the numeral 123 includes a carriage 124 having wheels 125 riding on tracks 126. A pair of hydraulic cylinders 127 are secured to the carriage in upright positions and carry a frame member 128 having a pair of upwardly extending guide sections 129. Plates 130 each having a U-shaped cut-out 131 in the upper end thereof are slidably mounted in the guide plates 129 and may be secured at 132 to the hydraulic cylinder rods 133.

Figure 9:
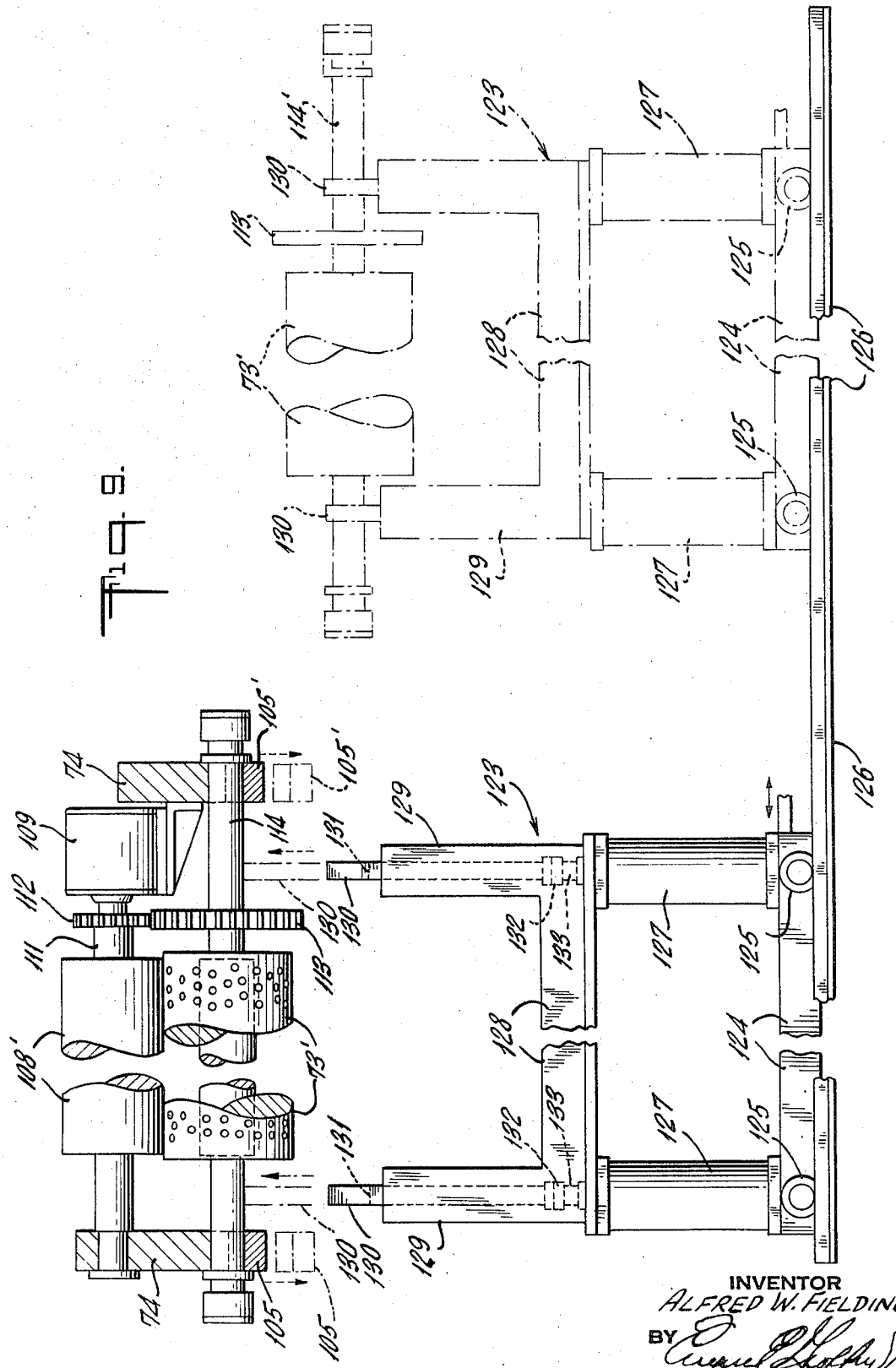
FIG. 9 is a cross-sectional view of FIG. 6 taken along the line 9—9 thereof.

With this arrangement an embossing roller can be removed by positioning the hydraulic lift 123 immediately beneath the roller as illustrated in solid lines in FIG. 9. The hydraulic cylinders 127 are then operated to raise the plates 130 until the cut-outs 131 engage the embossing roller shaft 114 or 114' as the case may be. The bearing blocks 105 or 105' are then removed and the hydraulic cylinders 127 are operated to lower the embossing roller whereupon the hydraulic lift assembly is moved to the right as shown in dotted outline in FIG. 9. The roller can then be removed from the hydraulic lift and the new roller positioned in place for installation in the apparatus.

The utilization of a turret mount for the embossing rollers which are relatively heavy permits rapid interchange of the rollers with a minimum loss of operating time for the machine. Furthermore, the replacement of an embossing roller which is not in the operating position can be accomplished while the machine is in operation.

While only certain embodiments of the invention have been illustrated and described, it is apparent that alterations, modifications and changes may be made without departing from the true scope and spirit thereof as defined by the appended claim.

What is claimed is:

1. The method for manufacturing cellular cushioning material comprising the steps of continuously moving a sheet of plastic having an activatable adhesive on at least one surface thereof though a predetermined path and about an embossing roller, moving a heater from a position displaced from said sheet to a position in close proximity to said sheet to heat said sheet above the embossing temperature and the activating temperature of said adhesive, embossing said sheet on the embossing roller with the activated adhesive coating exposed and then adhering a second sheet of material to the embossed sheet, said method further including the steps of moving said first sheet about a second roller in advance of said embossing roller, temperature controlling both of said rollers and applying heat to the first said sheet as it moves about said second roller and during at least part of its travel about said embossing roller.

2. The method according to claim 1 including the step of applying said adhesive coating to the first said sheet immediately prior to the movement thereof about said roller.

3. The method according to claim 2 wherein said adhesive is selected from the group consisting of thermoplastic polyurethanes, polyvinyl acetates, polyvinyl acetate-ethylene copolymers, polyvinylidene chloride and blends thereof, polyvinyl acetate acrylate copolymers, nitrile rubber polymers linear saturated polyesters and complex acrylic interpolymers.

4. The method according to claim 1 wherein said adhesive is selected from the group consisting of thermoplastic polyurethanes, polyvinyl acetates, polyvinyl acetate-ethylene copolymers, polyvinylidene chloride and blends thereof, polyvinyl acetate acrylate copolymers and nitrile rubber polymers.

5. The method for manufacturing cellular cushioning material comprising the steps of continuously moving a sheet of plastic having an activatable adhesive on at least one surface thereof though a predetermined path and about an embossing roller, moving a heater from a position displaced from said sheet to a position in close proximity to said sheet to heat said sheet above the embossing temperature and the activating temperature of said adhesive, embossing said sheet on the embossing roller with the activated adhesive coating exposed and then adhering a second sheet of material to the embossed sheet, said method further including the step of heating the first said sheet while on the embossing roller.

6. The method according to claim 5 including the step of applying said adhesive coating to the first said sheet immediately prior to the movement thereof about said roller.

7. The method according to claim 6 wherein said adhesive is selected from the group consisting of thermoplastic polyurethanes, polyvinyl acetates, polyvinyl acetate-ethylene copolymers, polyvinylidene chloride and blends thereof, polyvinyl acetate acrylate copolymers, nitrile rubber polymers, linear saturated polyesters and complex acrylic interpolymers.

8. The method according to claim 5 wherein said adhesive is selected from the group consisting of thermoplastic polyurethanes, polyvinyl acetates, polyvinyl acetate-ethylene copolymers, polyvinylidene chloride and blends thereof, polyvinyl acetate acrylate copolymers and nitrile rubber polymers.

* * * * *